Dec. 23, 1930.  H. MARLES  1,785,870
COUPLING
Filed Aug. 9, 1926  2 Sheets-Sheet 1

Inventor
Henry Marles
By
Attorneys

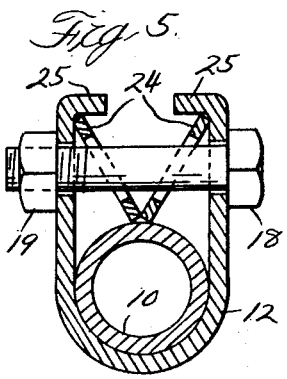
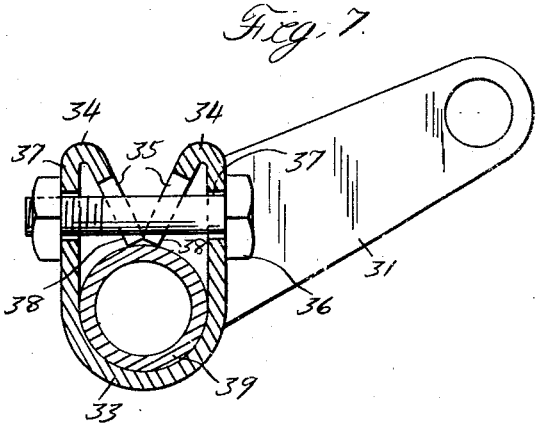
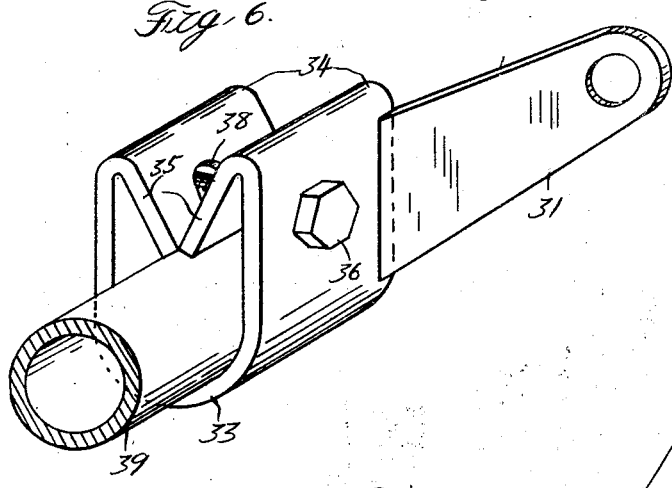
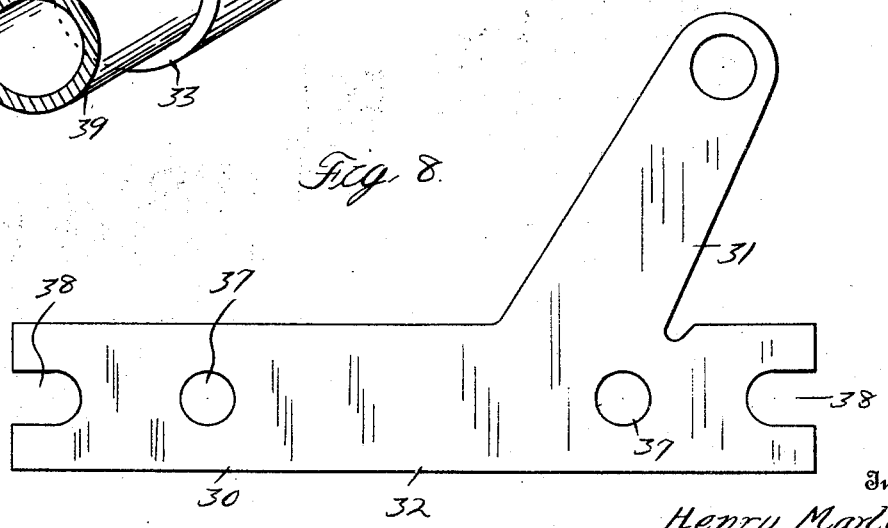

Patented Dec. 23, 1930

1,785,870

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

COUPLING

Application filed August 9, 1926. Serial No. 128,273.

This invention relates to couplings or unions employed for connecting the adjacent ends of two rods or the like or for connecting a lever or the like to a rod or the like.

The invention has as one of its primary objects to provide a coupling or union of the character illustrated which may be quickly and economically manufactured, easily installed and one which is furthermore strong and durable.

The several objects, advantages and novel details of construction of this invention will be made more apparent as this description proceeds, especially when considered in connection with the accompanying drawings wherein;

Figure 5 is a similar view showing still another modified form of construction.

Figure 6 is a perspective view showing another modified form of construction.

Figure 7 is a transverse sectional view of the structure illustrated in Figure 6 and Figure 8 is a plan view of the blank from which the structure illustrated in Figures 6 and 7 is developed.

Figure 1:
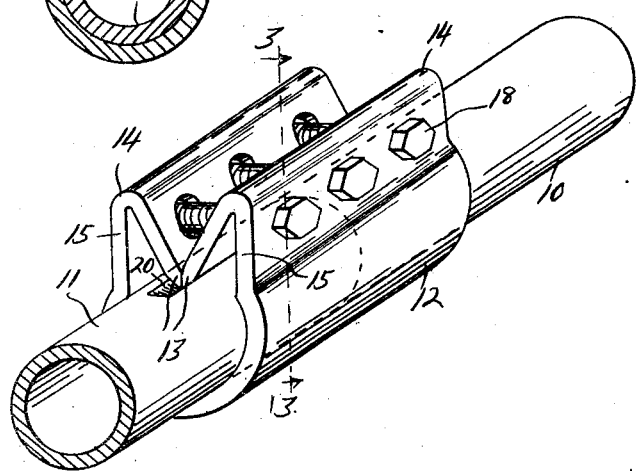
Figure 1 is a perspective view showing a coupling constructed in accordance with this invention.
Figure 2:
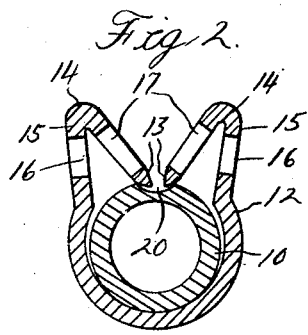
Figure 2 is a transverse sectional view taken through the coupling before the same is completely assembled.
Figure 3:
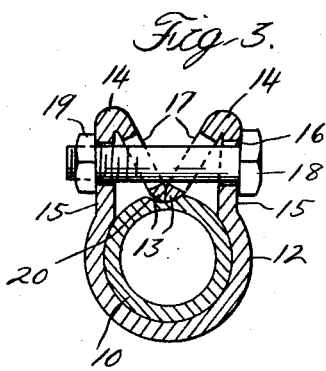
Figure 3 is a sectional view taken substantially on the plane indicated by line 3—3 in Figure 1.

Referring now to the drawings and particularly to Figures 1 to 3 thereof the first form of the invention will be described in detail. In these figures it will be noted that the problem is to unite or couple the adjacent ends of shafts or rods 10 and 11. For this purpose there is provided a sleeve-like element or member 12 which substantially embraces the ends of the rods 10 and 11. The member 12 is provided with cooperating portions 13 adapted to impinge or be forced into engagement with the adjacent surfaces of the rods 10 and 11. These cooperating portions 13 are herein shown as inwardly extending projections formed integrally on a part of the sleeve-like member 12. For this purpose the member 12 is provided adjacent each longitudinal edge thereof with a return bend 14 which produces the pair of inwardly extending projections 13 which lie adjacent to but spaced from substantially parallel portions 15. It will be noted that the projections 13 are inclined with reference to the substantially parallel portions 15. The portions 15 are provided with one or more apertures 16 and the projections 13 with a corresponding number of apertures 17 which, however, are preferably of larger diameter. Bolts 18 are adapted to be extended through the aligned apertures 16 and 17 in the parts 13 and 15 and be secured in place by means of nuts 19. When the bolts 18 are inserted and the nuts 19 screwed into place the projections 13 will be forced into engagement with the adjacent surface of the rods 10 and 11 and caused to impinge the same with sufficient force to securely unite the two rods 10 and 11 and the coupling member. It is noted that the transverse clamping action caused by the bolts and nuts produces a movement of the projections 13 in a direction substantially perpendicular to the axis of the rods 10 and 11 to thus cause a binding action between the parts which not only prevents relative rotation between the two rods 10 and 11 but relative axial movement as well.

Relative rotative movement between the parts may be further guarded against by providing a groove or slot 20 in the surfaces of the rods 10 and 11 adapted to be engaged by the projections 13. However, it will be readily apparent that these grooves are unnecessary and may be provided solely for the purpose of additional security.

Figure 4:
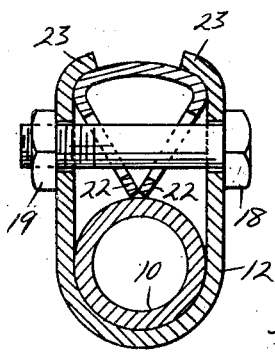
Figure 4 is a similar sectional view showing a modified form of construction.

While in the form of the invention just described the projections 13 are described and illustrated as formed integrally with the sleeve-like member 12 nevertheless these projections may be formed separately from this member in the manner illustrated in Figures 4 and 5. In Figure 4 the sleeve-like element 12 is shown as provided with a cooperating member 21 having inwardly extending projections 22, the longitudinal edges of the member 12 being formed with lateral extensions 23 for engagement with the member 21. As in the previously described construction when the nuts 19 are tightened upon the bolts 18 the projections 22 will be caused to impinge the adjacent surface of the rod or tube 10 or 11.

In Figure 5 a pair of non-connected members 24 are provided which constitute the equivalent of the projections aforedescribed which are adapted for engagement with projections 25 formed on the sleeve-like member 12 and are adapted to impinge the rod 10 when the nuts 19 on the bolts 18 are tightened.

In Figures 6 to 8 inclusive an embodiment of the invention is shown wherein a lever or the like forming a part of the coupling element is adapted to be connected to a rod, tube or the like. In this form of the invention the device is developed from a blank 30 preferably stamped from sheet metal to provide an arm 31 integral therewith. The body 32 is bent to form the substantial sleeve-like portion 33 and the ends thereof are bent as at 34 to form inwardly directed extensions or projections 35. A bolt 36 is passed through apertures 37 formed in the body and through slots 38 formed in the ends or projections 35 so that when the bolt is tightened the ends 35 will be caused to impinge the rod or tube 39 to securely clamp the member thereto and to consequently couple the arm 31 to the rod 39.

From the foregoing it will be apparent that the invention contemplates means for readily coupling for instance the ends of two shafts, rods or the like or a shaft or rod to a lever. The construction of the coupling member is simple and is capable of being readily stamped or otherwise formed from sheet metal. While in every instance either two projections 13 or their equivalents have been illustrated nevertheless it will be apparent that but one projection 13 may be employed and the invention will function with equal efficiency.

In view of the obvious modifications of which the invention is capable reservation is made to make such changes in the essentials and all the non-essentials of the invention as may come within the purview of the accompanying claims.

What I claim as my invention is:

1. In a coupling, the combination with a pair of axially aligned shafts, each having a longitudinally extending groove, of a sleeve embracing the end portions of said shafts, a member associated with said sleeve and inclined with respect to said shafts and rockable to engage said groove, and means for rocking said member.

2. In a coupling, the combination with a pair of axially aligned shafts, each having a longitudinal groove, of a split sleeve embracing the end portions of the shafts, the longitudinal edges of the sleeve having flanges, said flanges having return-bent portions engaging in the grooves in the shafts, and means for forcing the return-bent portions into firm engagement with the grooves in said shafts.

3. In a coupling, the combination with a pair of axially aligned shafts, each having a longitudinal groove, of a split sleeve embracing the end portions of said shafts, shaft impinging members associated with the longitudinal edges of said sleeve and adapted to engage said shafts and being angularly arranged with respect to each other, and means for varying the angular relation between said members to cause the same to seat in said grooves and firmly engage said shafts.

In testimony whereof I affix my signature.

HENRY MARLES.